US010396571B2

(12) United States Patent
Rana et al.

(10) Patent No.: US 10,396,571 B2
(45) Date of Patent: Aug. 27, 2019

(54) ADAPTIVE OVERVOLTAGE PROTECTION FOR ADAPTIVE POWER ADAPTERS

(71) Applicant: FAIRCHILD SEMICONDUCTOR CORPORATION, San Jose, CA (US)

(72) Inventors: Dibyendu Rana, Santa Clara, CA (US); Chih-Hsien Hsieh, Hsinchu (TW); Demon Hsu, Taipei (TW); Hangseok Choi, Bedford, NH (US)

(73) Assignee: FAIRCHILD SEMICONDUCTOR CORPORATION, Phoenix, AZ (US)

( * ) Notice: Subject to any disclaimer, the term of this patent is extended or adjusted under 35 U.S.C. 154(b) by 475 days.

(21) Appl. No.: 15/010,370

(22) Filed: Jan. 29, 2016

(65) Prior Publication Data
US 2016/0241016 A1 Aug. 18, 2016

Related U.S. Application Data

(60) Provisional application No. 62/117,176, filed on Feb. 17, 2015.

(51) Int. Cl.
*H02H 3/20* (2006.01)
*H02J 7/00* (2006.01)
(Continued)

(52) U.S. Cl.
CPC ........... *H02J 7/0029* (2013.01); *H02H 3/006* (2013.01); *G06F 1/26* (2013.01); *H02H 3/202* (2013.01); *H02H 7/18* (2013.01); *H02H 7/20* (2013.01)

(58) Field of Classification Search
CPC .......... G06F 1/26; G06F 1/30; G06F 13/4282; G06F 2213/0042; H02H 3/006;
(Continued)

(56) References Cited

U.S. PATENT DOCUMENTS 5,991,172 A * 11/1999 Jovanovic ........... H02M 1/4258
363/132
6,150,845 A 11/2000 Morrill
(Continued)

FOREIGN PATENT DOCUMENTS

CN 101515183 A 8/2009
CN 203827185 U 9/2014

OTHER PUBLICATIONS

Fairchild—FAN501A Offline DCM / CCM Flyback PWM Controller for Charges Applications, Apr. 2014, 16 pages.
(Continued)

*Primary Examiner* — Thienvu V Tran
*Assistant Examiner* — Nicolas Bellido
(74) *Attorney, Agent, or Firm* — AMPACC Law Group, PLLC

(57) ABSTRACT

A power adapter includes a protocol integrated circuit (IC) on a secondary side of a transformer and a controller IC on a primary side of the transformer. The power adapter has an output voltage that changes depending on the charging voltage requirement of an electronic device (e.g., mobile device) connected to receive power from the power adapter. The power adapter includes an adaptive overvoltage protection mode that sets an overvoltage protection threshold to a low level during startup and thereafter sets the overvoltage protection threshold to a higher level after detecting proper operation of the protocol IC.

19 Claims, 8 Drawing Sheets

(51) Int. Cl.
*H02H 3/00* (2006.01)
*G06F 1/26* (2006.01)
*H02H 7/18* (2006.01)
*H02H 7/20* (2006.01)

(58) Field of Classification Search
CPC ............ H02H 3/202; H02H 7/18; H02H 7/20;
H02H 1/06; H02H 11/003; H02H 3/003;
H02H 3/023; H02H 3/18; H02H 3/20;
H02H 3/205; H02H 3/207; H02H 3/22;
H02H 3/24; H02H 7/09; H02H 7/10;
H02H 7/12; H02H 7/1252; H02H 9/00;
H02H 9/02; H02H 9/04; H02H 9/041;
H02H 9/045; H02H 9/046; H02H 9/048;
H02H 9/06; H02J 7/0029; H02J
2007/0062; H02J 7/0021; H02J 7/0052;
H02J 7/007; H02J 7/10; H02M 1/08;
H02M 2001/0032; H02M 2001/0054;
H02M 3/33507; H02M 1/32; H02M 1/34;
H02M 1/38; H02M 3/335; H03K
2017/307; Y02B 70/16; G05F 1/10; G05F
1/571; H01R 13/6666; H01R 24/60
See application file for complete search history.

(56) References Cited

U.S. PATENT DOCUMENTS

| | | | |
|---|---|---|---|
| 6,163,199 A | 12/2000 | Miske et al. | |
| 6,344,958 B1 | 2/2002 | Morrill | |
| 6,538,867 B1 | 3/2003 | Goodell et al. | |
| 8,022,640 B2* | 9/2011 | Chen | H02J 7/022 |
| | | | 315/291 |
| 8,085,559 B1* | 12/2011 | Choi | H02M 3/3376 |
| | | | 363/21.02 |
| 8,519,642 B2 | 8/2013 | Ahn et al. | |
| 8,729,822 B2 | 5/2014 | Chung et al. | |
| 8,861,164 B2 | 10/2014 | Mikolajczak | |
| 8,937,462 B2 | 1/2015 | Park et al. | |
| 9,019,674 B2 | 4/2015 | Mikolajczak | |
| 9,136,765 B2* | 9/2015 | Balakrishnan | H02M 3/33523 |
| 9,172,239 B2 | 10/2015 | Mikolajczak | |
| 9,224,566 B2 | 12/2015 | Snowdon | |
| 9,461,465 B1* | 10/2016 | Tam | H02H 3/20 |
| 2008/0136342 A1* | 6/2008 | Tamegai | H02M 1/32 |
| | | | 315/209 R |
| 2009/0244931 A1* | 10/2009 | Brkovic | H02M 1/36 |
| | | | 363/21.1 |
| 2011/0194314 A1* | 8/2011 | Morota | H02M 3/33507 |
| | | | 363/21.15 |
| 2013/0064566 A1* | 3/2013 | Kojima | H02M 3/33523 |
| | | | 399/88 |
| 2014/0028095 A1* | 1/2014 | Maru | H02M 3/33523 |
| | | | 307/31 |
| 2014/0192566 A1* | 7/2014 | Yang | H02M 3/33523 |
| | | | 363/21.15 |
| 2014/0195065 A1* | 7/2014 | Yang | H02M 3/33523 |
| | | | 700/298 |
| 2014/0218976 A1* | 8/2014 | Luo | H02M 3/33507 |
| | | | 363/21.01 |
| 2014/0245030 A1* | 8/2014 | Helfrich | G06F 1/26 |
| | | | 713/300 |
| 2014/0301117 A1* | 10/2014 | Hirabayashi | G03G 15/5004 |
| | | | 363/21.15 |
| 2015/0003121 A1* | 1/2015 | Yang | H02M 3/33523 |
| | | | 363/21.17 |
| 2015/0103567 A1* | 4/2015 | Wang | H02M 3/33592 |
| | | | 363/21.13 |
| 2015/0372603 A1* | 12/2015 | Tang | H02M 3/33523 |
| | | | 363/21.15 |
| 2016/0064978 A1* | 3/2016 | Lei | H02J 7/0004 |
| | | | 320/114 |

OTHER PUBLICATIONS

Fairchild—AN 8209 Design Guideline for Quick Charger Using FAN6100M/FAN6100Q/FAN6100HM, 2015, 16 pages.
Chinese Office Action for Chinese Patent Application No. 201610090302.1, dated Nov. 29, 2018.

* cited by examiner

ADAPTIVE OVERVOLTAGE PROTECTION FOR ADAPTIVE POWER ADAPTERS

CROSS-REFERENCE TO RELATED APPLICATION

This application claims the benefit of U.S. Provisional Application No. 62/117,176, filed on Feb. 17, 2015, which is incorporated herein by reference in its entirety.

BACKGROUND OF THE INVENTION

1. Field of the Invention

The present invention relates generally to electrical circuits, and more particularly but not exclusively to power adapters.

2. Description of the Background Art

Power adapters that employ fast charging technologies, such as the Qualcomm Quick Charge 2.0™ technology, allow mobile devices (e.g., smartphones and tablets) to be charged up to 75% faster than conventional power adapters. Fast charge power adapters are typically capable of charging legacy mobile devices at 5V and fast charging newer mobile devices at 9V and 12V. As a particular example, a fast charge travel power adapter can adaptively change its output voltage according to the charging requirement of the connected mobile device. The travel power adapter can thus be employed to charge both legacy mobile devices and fast charge-enabled mobile devices.

SUMMARY

In one embodiment, a power adapter includes a protocol integrated circuit (IC) on a secondary side of a transformer and a controller IC on a primary side of the transformer. The power adapter has an output voltage that changes depending on the charging voltage requirement of an electronic device (e.g., mobile device) connected to receive power from the power adapter. The power adapter includes an adaptive overvoltage protection mode that sets an overvoltage protection threshold to a low level during startup and thereafter sets the overvoltage protection threshold to a higher level after detecting proper operation of the protocol IC.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of electrical circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
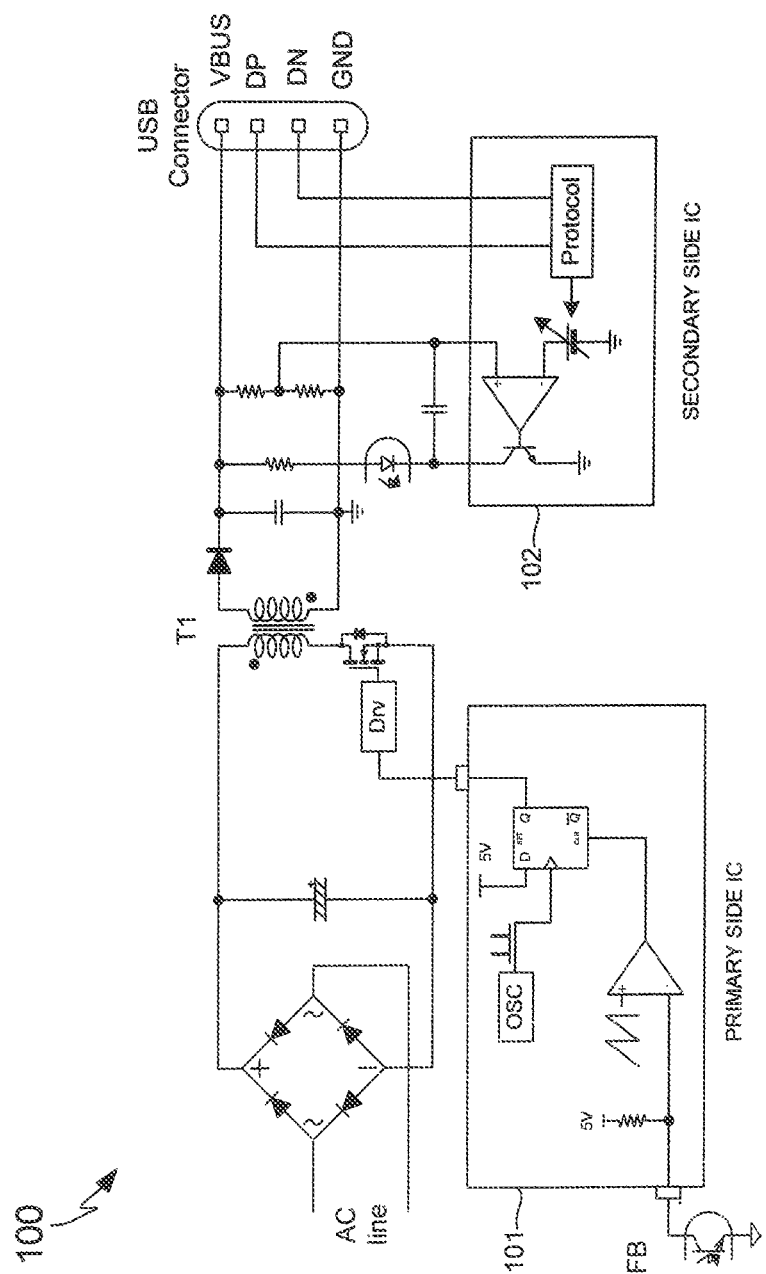
FIG. 1 shows a schematic diagram of an example adaptive power adapter.

FIG. 1 shows a schematic diagram of an example adaptive power adapter 100 that is capable of fast charging mobile devices. The power adapter 100 may comply with the requirements of the Qualcomm Quick Charge 2.0™ technology, for example. The power adapter 100 is plugged into an AC line source to generate a DC output voltage at a Universal Serial Bus (USB) connector. A mobile device (not shown) is connected to the USB connector for charging. The power adapter 100 includes a primary side integrated circuit (IC) 101 (e.g., pulse width modulation (PWM) controller) on the primary side of a transformer T1 and a secondary side IC 102 (e.g., protocol IC) on the secondary side of the transformer T1.

The power adapter 100 is an adaptive power adapter in that its output voltage, which is provided on the VBUS pin of the USB connector, changes depending on the charging voltage requirement of the connected mobile device. For example, the power adapter 100 can charge 5V, 9V, and 12V mobile devices. Generally speaking, adaptive power adapters are convenient because they can be employed to charge both legacy and newer mobile devices. One problem with currently available adaptive power adapters is that they may not be able to provide overvoltage protection to lower-voltage legacy devices in the event of a secondary side IC failure. For example, a primary controller IC typically has only one overvoltage protection threshold level, which is set for the highest supported voltage. As a particular example, when the maximum output voltage of the power adapter is 12V, the primary controller IC overvoltage protection threshold is typically set for 14V. This creates a dangerous condition where a legacy mobile device that is designed to receive only 5V can receive up to 14V when the secondary side IC malfunctions. This problem is graphically illustrated in FIG. 2.

Figure 2:
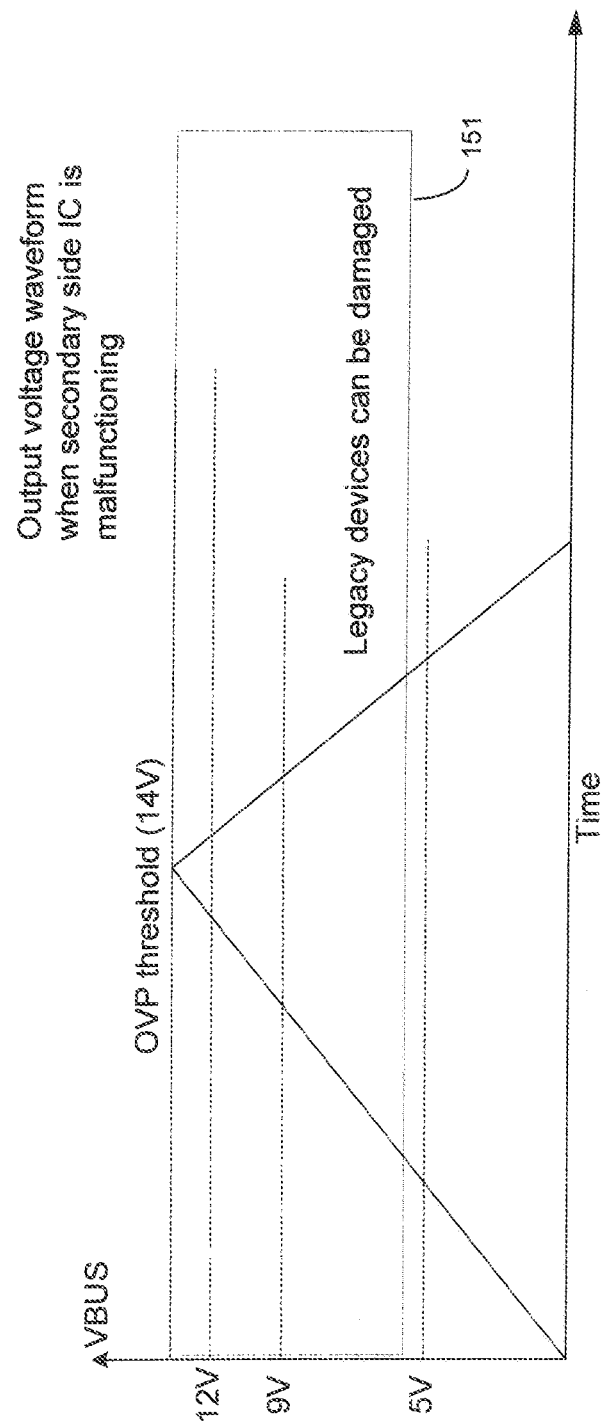
FIG. 2 graphically illustrates a dangerous condition in which a legacy mobile device is not protected from overvoltage when a secondary IC on a secondary side of a transformer malfunctions during startup.

FIG. 2 shows a plot of the charging voltage (VBUS) over time. As illustrated in FIG. 2, in the event of a secondary side IC malfunction, the output voltage delivered to the connected mobile device can increase up to the overvoltage protection (OVP) threshold before overvoltage protection is triggered to shut down the output voltage. When the OVP threshold is set relatively high, such as 14V in the example of FIG. 2, legacy devices that are designed to be charged at 5V will be damaged. FIG. 2 shows an example output voltage range labeled as 151 that can potentially damage 5V legacy mobile devices.

Figure 3:
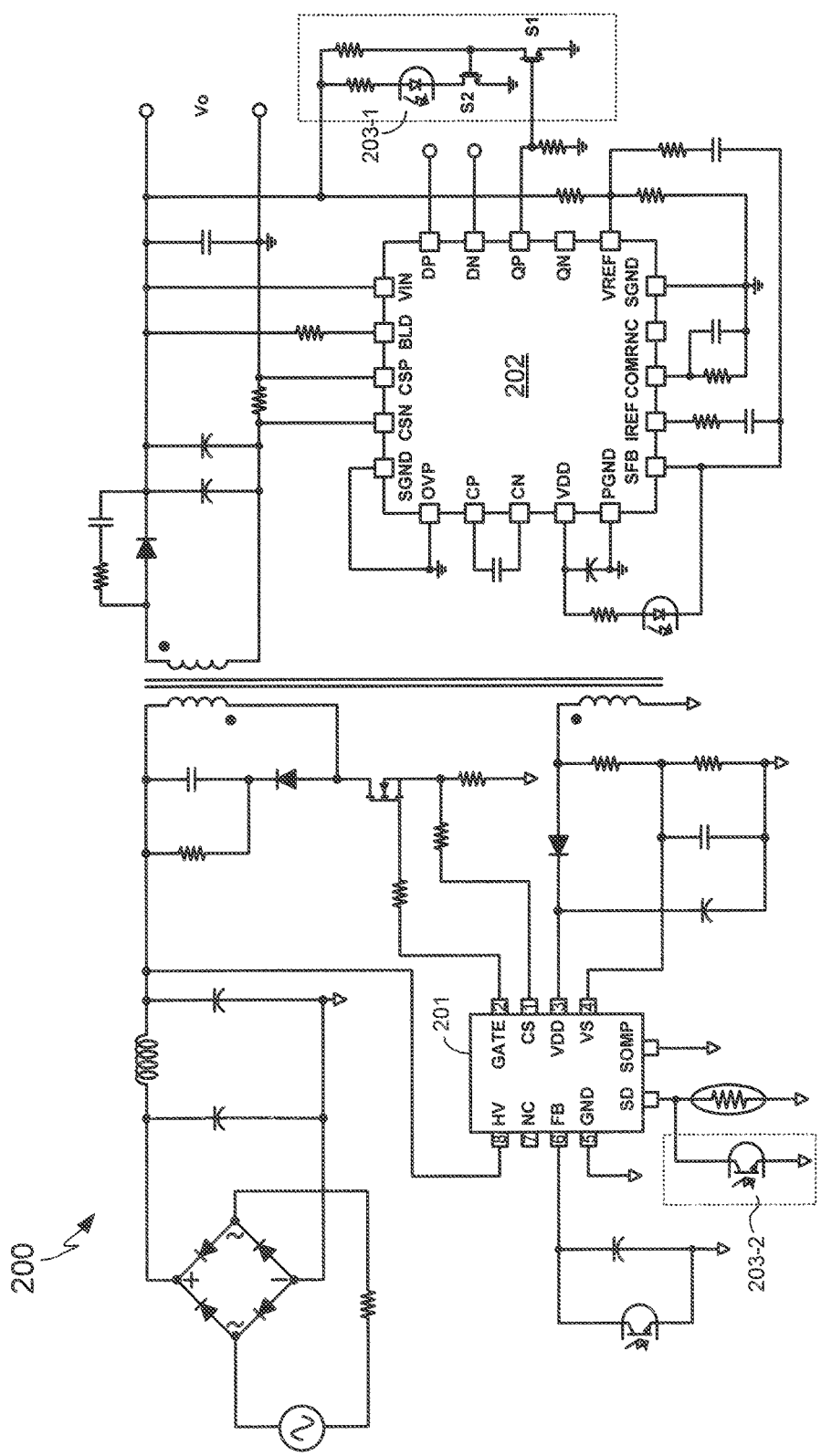
FIG. 3 shows an example adaptive power adapter with overvoltage protection for secondary side IC malfunctions during startup.

FIG. 3 shows an example adaptive power adapter 200 with overvoltage protection. The power adapter 200 includes a primary side IC 201 (e.g., Fairchild Semiconductor™ FAN501A IC) and a secondary side IC 202 (e.g., Fairchild Semiconductor™ FAN6100Q IC). In the example of FIG. 3, the QP signal at the QP pin of the secondary side IC 202 indicates whether or not the secondary side IC 202 is malfunctioning. When the QP signal is high, the secondary side IC is properly biased and operating. In that case, the switch S1 turns ON and the switch S2 turns OFF, and no current flows to the optocoupler 203, which comprises a light source 203-1 on the secondary side and a photodetector 203-2 on the primary side. A low QP signal indicates that the secondary side IC 202 is malfunctioning. In that case, the switch S1 turns OFF and the switch S2 turns ON, thereby pulling current through the optocoupler 203 and activating the shutdown function of the primary side IC 201. The power adapter 200 requires external components to provide overvoltage protection for secondary side IC malfunctions during startup, thereby increasing the cost and size of the power adapter.

Figure 4:
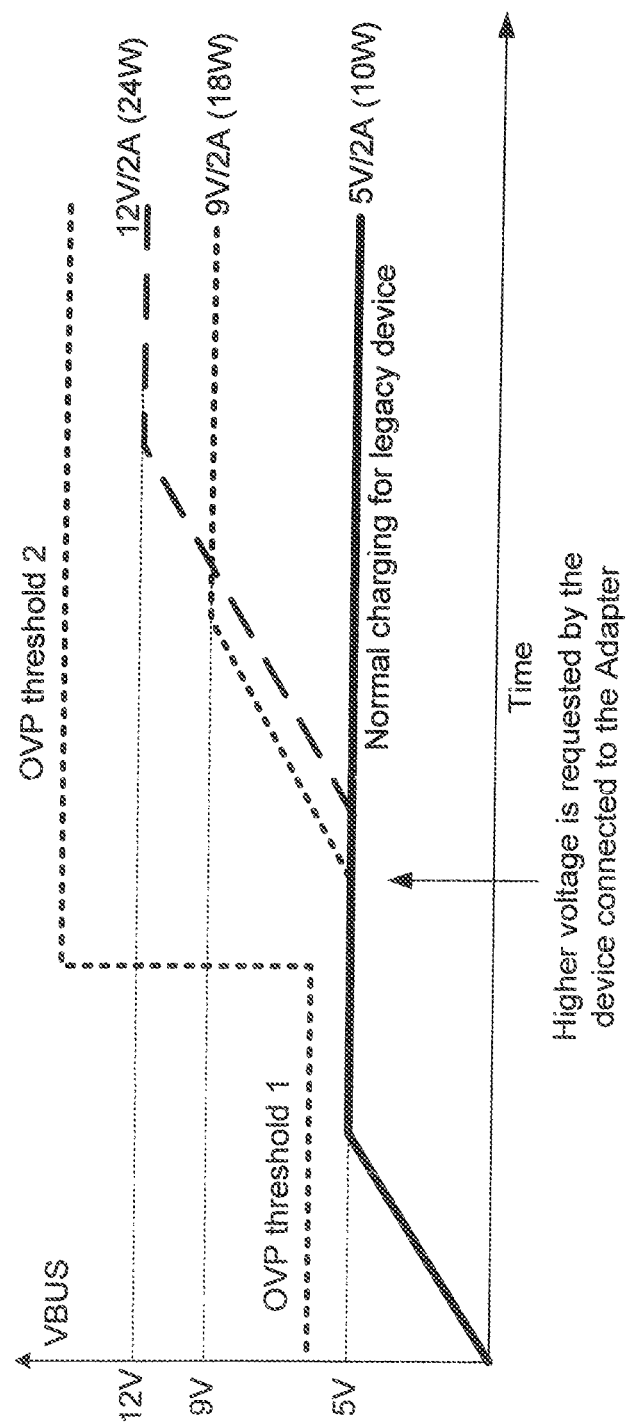
FIG. 4 shows plots that illustrate a method of providing adaptive overvoltage protection to adaptive power adapters in accordance with an embodiment of the present invention.

FIG. 4 shows plots that illustrate a method of providing adaptive overvoltage protection to adaptive power adapters in accordance with an embodiment of the present invention. In the example of FIG. 4, the method includes two overvoltage protection thresholds, one (OVP threshold 1) for low voltage mobile devices (e.g., 5V legacy mobile devices) and another (OVP threshold 2) for higher-voltage mobile devices (e.g., 9V and 12 fast charge-enabled mobile devices). In the example of FIG. 4, the adaptive overvoltage protection initially sets a low level overvoltage protection threshold to protect 5V mobile devices. After a period of time once the proper operation of the secondary side IC is verified based on the regulated 5V output, the overvoltage protection threshold is adjusted to a higher level to protect high voltage (e.g., 9V and 12V) mobile devices. For example, the initial overvoltage protection threshold may be set to 6V and the final overvoltage protection threshold may be set to 14V. Currently existing power adapters may incorporate the adaptive overvoltage protection method of FIG. 4 with minimal or no additional components, thus allowing for protection of mobile devices when the secondary side IC is malfunctioning during startup at relatively low cost.

Figure 5:
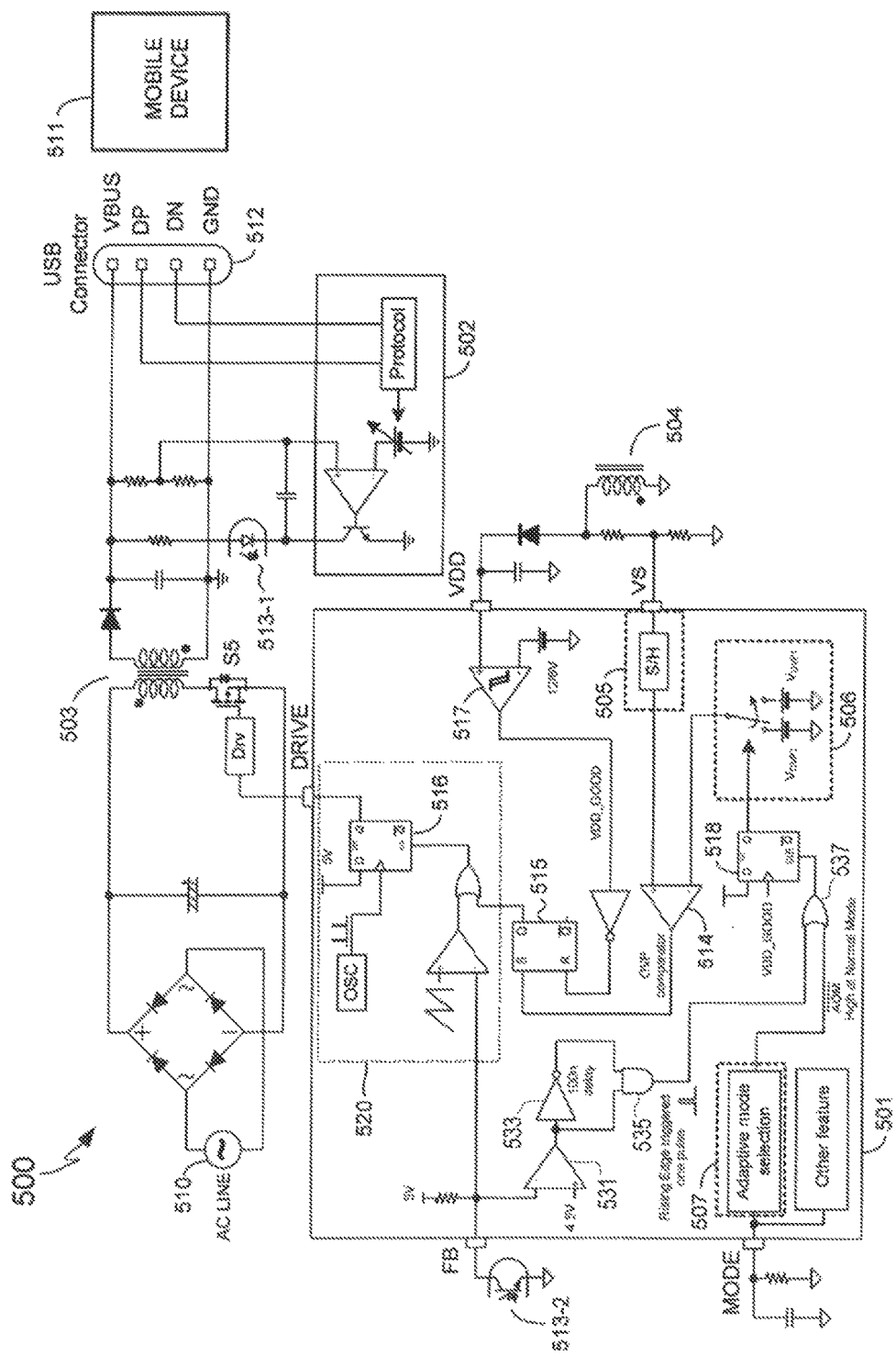
FIG. 5 shows a schematic diagram of an adaptive power adapter in accordance with an embodiment of the present invention.

FIG. 5 shows a schematic diagram of an adaptive power adapter 500 in accordance with an embodiment of the present invention. The power adapter 500 is an adaptive power adapter in that its output voltage changes depending on the charging voltage requirement of the connected electronic device, which in the example of FIG. 5 is a mobile device. For example, the power adapter 500 can charge 5V, 9V, and 12V mobile devices. The power adapter 500 may be, but not necessarily, a travel power adapter given its relatively small form factor and capability to charge mobile devices with different charging voltage requirements.

In the example of FIG. 5, the power adapter 500 connects to an AC line source 510 to generate a DC output voltage, which is used as a charging voltage for charging a mobile device 511 that is connected to a connector 512. In one embodiment, the connector 512 is a USB connector and the charging voltage is the output voltage at the VBUS pin. The mobile device 511 may be a smartphone, tablet, laptop, etc. In light of the present disclosure, one of ordinary skill in the art will appreciate that embodiments of the present invention may also be employed to charge other suitable electronic devices.

In the example of FIG. 5, the power adapter 500 includes a primary side controller IC 501 on the primary side of the transformer 503 and a secondary side protocol IC 502 on the secondary side of the transformer 503. Although the primary side controller IC 501 and the secondary side protocol IC 502 are implemented as integrated circuits, embodiments of the present invention may also be implemented with discrete circuits or combination of discrete and integrated circuits.

In the example of FIG. 5, the secondary side protocol IC 502 allows for fast charging of the mobile device 511 in accordance with a fast charge protocol. More particularly the secondary side protocol IC 502 may allow for charging of the battery of the mobile device 511 in accordance with a fast charge protocol, such as that of the Qualcomm Quick Charge 2.0™ technology or some other fast charge protocol. The secondary side protocol IC 502 may communicate with the mobile device 511 by way of the DP and DN pins of the USB connector (FIG. 5, connector 512).

In the example of FIG. 5, the primary side controller IC 501 includes a switch controller 520 that controls the switching operation of the switch S5, e.g., by pulse width modulation (PWM), to generate the output voltage for charging the mobile device 511. In the example of FIG. 5, the switch controller 520 drives the switch S5 by outputting a gate drive signal at a DRIVE pin in accordance with a feedback signal received at the FB pin. The switching operation of the switch S5 induces generation of the output voltage on the secondary side of the transformer 503. In one embodiment, the output voltage is provided at the VBUS pin and is referenced to the GND pin of the USB connector.

The primary side controller IC 501 may detect the output voltage by way of the feedback signal FB received from an optocoupler 513, which comprises a light source 513-1 on the secondary side and a photodetector 513-2 on the primary side. In the example of FIG. 5, the primary side controller IC 501 includes the FB pin for receiving the feedback signal FB.

The primary side controller IC 501 may include a mode selection block 507 for selecting adaptive overvoltage protection mode. The mode selection block 507 may allow for selection of adaptive overvoltage protection mode by way of, for example, a signal received on the MODE pin of the primary side controller IC 501. When adaptive overvoltage protection mode is selected, the primary side controller IC 501 may perform adaptive overvoltage protection in accordance with FIG. 4. More particularly, when adaptive overvoltage protection mode is selected, the primary side controller IC 501 initially sets the overvoltage protection threshold at a low level during startup and thereafter sets the overvoltage protection threshold at a higher level when proper operation of the secondary side protocol IC 502 is detected.

In the example of FIG. 5, the transformer 503 includes an auxiliary winding 504 for sensing the output voltage during startup. The voltage on the auxiliary winding 504 is induced by the switching operation of the switch S5, and is thus indicative of the output voltage. The primary side controller IC 501 includes an output voltage monitoring circuit 505, such as a sample and hold circuit, to sense the output voltage during startup. In one embodiment, the sensed output voltage is received by the primary side controller IC 501 at a VS pin.

In one embodiment, the sensed output voltage at the VS pin is compared by an overvoltage protection comparator 514 to an overvoltage protection threshold to detect overvoltage. In the example of FIG. 5, the overvoltage protection threshold is provided by an OVP threshold generator 506. The OVP threshold generator 506 may comprise an analog multiplexer, which in the example of FIG. 5 provides either a first overvoltage protection threshold ($V_{OVP1}$) or a second overvoltage protection threshold ($V_{OVP2}$). The first overvoltage protection threshold may be for low voltage legacy mobile devices and the second overvoltage protection threshold may be for fast charge enabled high voltage mobile devices. In one embodiment, the primary side controller IC 501 initially selects the first overvoltage protection threshold during startup and then selects the second overvoltage protection threshold when the secondary side protocol IC 502 is confirmed to be properly operating.

In the example of FIG. 5, the primary controller IC 501 includes a VDD detect circuit 515 (e.g., hysteresis comparator) that is also coupled to the auxiliary winding 504 through a VDD pin. Unlike the sensed output at the VS pin, the sensed output at the VDD pin is not scaled to allow the VDD detect circuit 515 to detect if the output voltage is maintained at the high voltage. If so, the VDD detect circuit 515 outputs a VDD_GOOD signal, which clocks a D flip-flop 518 to select the second (and higher level) overvoltage protection threshold from the OVP threshold generator 506. Otherwise, if the secondary side protocol IC 502 is not properly operating, the D flip-flop 518 is not clocked, and continue to select the first (and lower level) overvoltage protection threshold from the OVP threshold generator 506.

To detect an overvoltage, the overvoltage protection comparator 514 compares the sensed output voltage from the output voltage monitoring circuit 505 to either the first or second overvoltage protection threshold (whichever is active) provided by the OVP threshold generator 506. When an overvoltage is detected, such as when the output voltage is greater than the active overvoltage protection threshold, the overvoltage protection comparator 514 sets the SR flip-flop 515 to clear the D flip-flop 516, thereby disabling the drive signal to the switch S5 and shutting down the output voltage.

In an example operation, the first overvoltage protection threshold ($V_{OVP1}$) may be set to 1.2V and the second overvoltage protection threshold ($V_{OVP2}$) may be set to 3.2V. Because the sensed output voltage at the VS pin is scaled, the 1.2V overvoltage protection threshold may be for an output voltage of 5V and the 3.2V overvoltage protection threshold may be for an output voltage of 12V. In an embodiment, the first overvoltage protection threshold is for protecting the electronic device when the electronic device is charged at 5V and the second overvoltage protection threshold is for protecting the electronic device when the electronic device is charged at 12V. At startup when the power adapter 500 is turned ON from an OFF state, the feedback voltage at the FB pin will saturate as the output voltage rises during startup. If the secondary side protocol IC 502 is functional, the feedback voltage will drop as the output voltage reaches 5V. If the secondary side protocol IC 502 malfunctions, the feedback voltage stays saturated. As the feedback voltage drops below 4.5V, the output of a saturation comparator 531 transitions from low to high, causing an inverter 533 and an AND gate 535 to generate a positive-going pulse that is received by an OR gate 537, which propagates the pulse to the clear input CLR of the D flip-flop 518, de-asserting the output Q of the D flip-flop 518, so that the overvoltage protection threshold level (which is compared to the sensed output voltage at the VS pin) will go back to 3.2V. If feedback voltage does not drop, the overvoltage protection threshold level stays at 1.2V, triggering overvoltage protection to protect a low voltage legacy mobile device when the output voltage goes beyond 5V.

Figure 6:
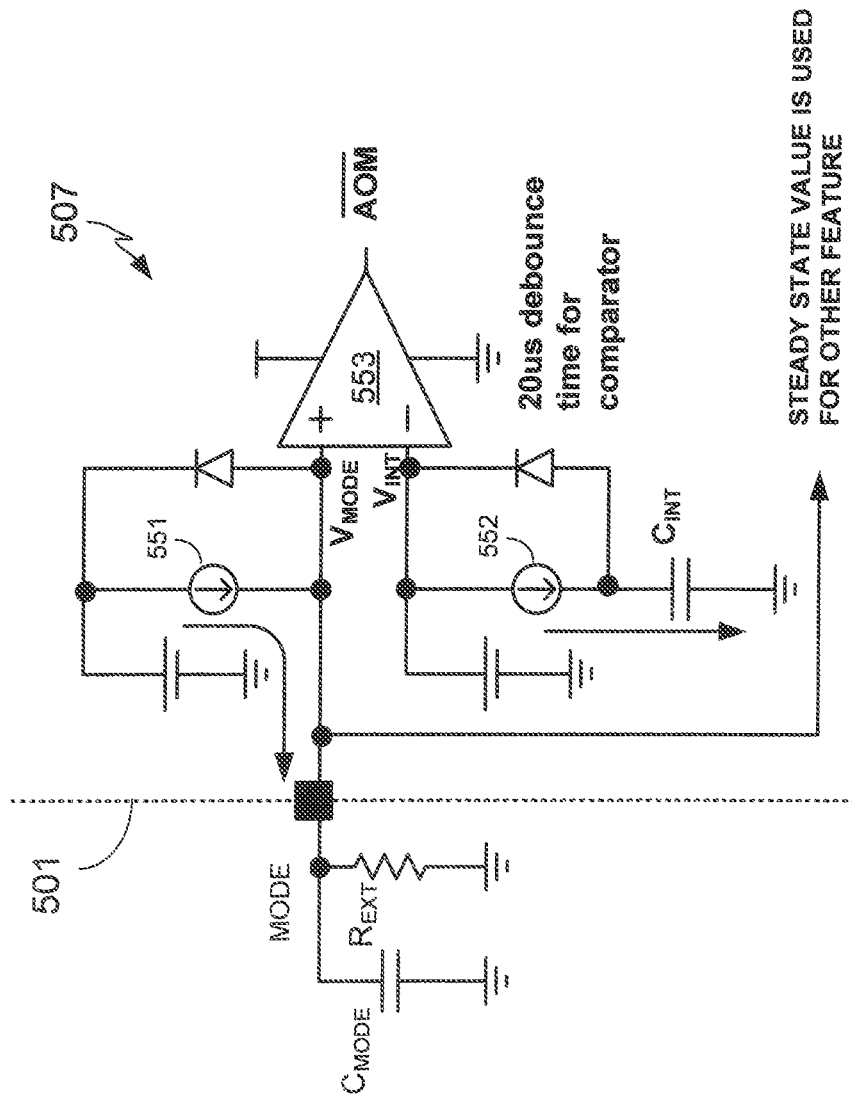
FIG. 6 shows a schematic diagram of a mode selection block in accordance with an embodiment of the present invention.

FIG. 6 shows a schematic diagram of a mode selection block 507 in accordance with an embodiment of the present invention. In the example of FIG. 6, adaptive overvoltage protection mode is enabled by way of the MODE pin of the primary side controller IC 501. For example, adaptive overvoltage protection mode may be enabled by coupling the MODE pin to ground by way of a mode capacitor $C_{MODE}$. A current source 551 charges the mode capacitor $C_{MODE}$ to develop a mode voltage $V_{MODE}$ at the MODE pin. A current source 552 charges an internal capacitor $C_{INT}$ to generate an internal voltage $V_{INT}$. A comparator 553 compares the mode voltage $V_{MODE}$ to the internal voltage $V_{INT}$ to generate an adaptive overvoltage protection mode signal AOM (active low in the example) to indicate that adaptive overvoltage protection mode is enabled. In one embodiment, the comparator 553 includes a debounce time (e.g., 20 μs) to delay comparison until the mode voltage $V_{MODE}$ and the internal voltage $V_{INT}$ are stable.

Figure 7:
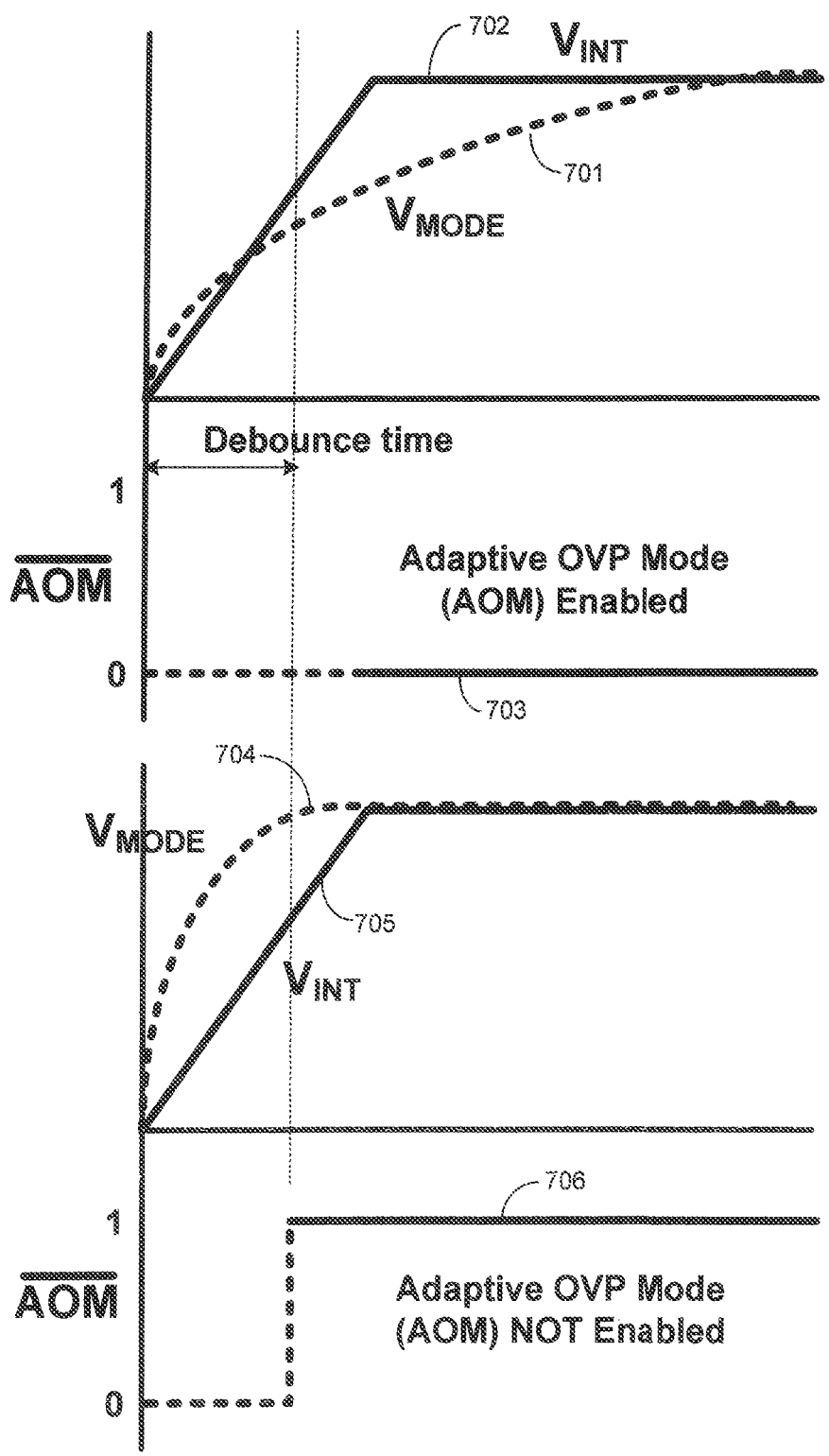
FIG. 7 shows timing diagrams of signals of the mode selection block of FIG. 6 in accordance with an embodiment of the present invention.

FIG. 7 shows timing diagrams of the mode selection block 507 in accordance with an embodiment of the present invention. The top timing diagram of FIG. 7 is for the case when adaptive overvoltage protection mode is enabled, and the bottom timing diagram of FIG. 7 is for the case when the adaptive overvoltage protection mode is not. enabled.

In one embodiment, the mode capacitor $C_{MODE}$ is coupled to the MODE pin when adaptive overvoltage protection mode is enabled. In that case, as shown in the top timing diagram of FIG. 7, the mode voltage $V_{MODE}$ (plot 701), during startup, rises at a time constant dictated by the capacitance of the mode capacitor $C_{MODE}$ and the resistance of the external resistor $R_{EXT}$. After the debounce time, there will be a period when the internal voltage $V_{INT}$ (plot 702) is larger than the mode voltage $V_{MODE}$, thereby placing the adaptive overvoltage protection mode signal AOM (plot 703) at a logic LOW and enabling adaptive overvoltage protection mode. The value of the mode voltage $V_{MODE}$ at steady state may be used by other circuit features of the primary side controller IC 501.

When adaptive overvoltage protection mode is not enabled (see bottom timing diagram of FIG. 7), the mode voltage $V_{MODE}$ (plot 704) during startup rises as the voltage on the external resistor $R_{EXT}$ rises. However, the internal voltage $V_{INT}$ (plot 705) will be smaller than the mode voltage $V_{MODE}$ even after the debounce mode, thereby placing the adaptive overvoltage protection mode signal AOM (plot 706) at a logic HIGH and disabling adaptive overvoltage protection mode.

Figure 8:
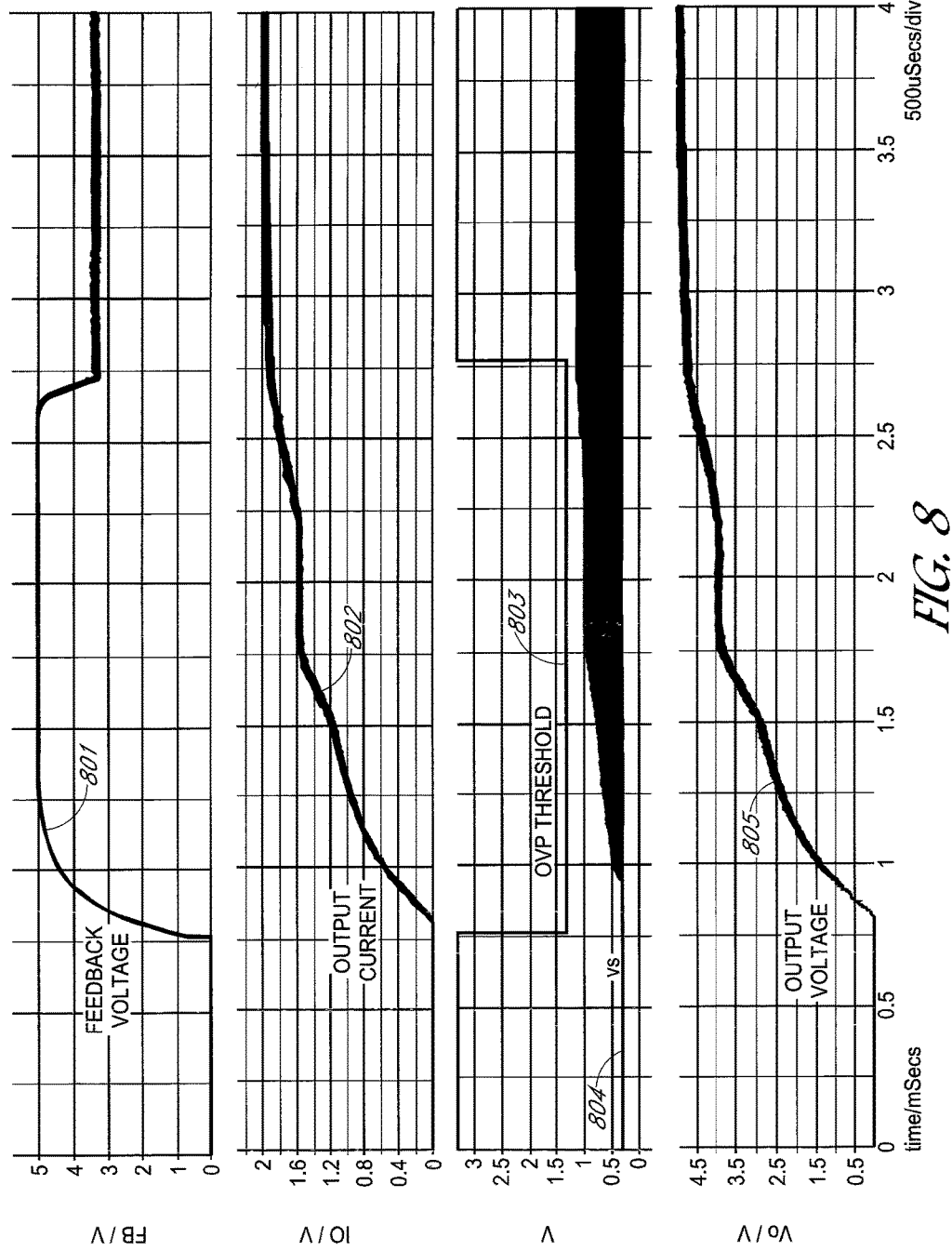
FIG. 8 shows simulation results for an adaptive power adapter in accordance with an embodiment of the present invention.

FIG. 8 shows simulation results for the power adapter 500 in accordance with an embodiment of the present invention. FIG. 8 shows, from top to bottom, the feedback voltage (plot 801), the output current (plot 802), the overvoltage protection threshold (plot 803), the sensed output voltage at the VS pin (plot 804), and the output voltage (plot 805).

The simulation results of FIG. 8 generally describe a method of operating the power adapter 500 in accordance with an embodiment of the present invention. As shown in FIG. 8, when adaptive overvoltage protection mode is enabled, the overvoltage protection threshold level is initially set at low voltage to protect 5V legacy mobile devices. During startup, the feedback voltage is saturated to high since the output voltage is lower than the target voltage.

Once the output voltage reaches 5V, the feedback voltage drops to normal range as the error amplifier comes out of saturation. Then, the overvoltage protection threshold level is switched to a higher level to allow for a higher output voltage.

Power adapters with adaptive overvoltage protection have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A controller integrated circuit (IC) comprising:
a switch controller that is configured to control switching operation of a switch on a primary side of a transformer, wherein the switching operation of the switch induces an output voltage on a secondary side of the transformer;
a feedback circuit that is configured to receive a feedback signal from a protocol IC on the secondary side of the transformer and detect, according to a magnitude of the feedback signal, proper operation of the protocol IC, wherein the protocol IC is configured to charge an electronic device with the output voltage in accordance with a charging protocol;
an overvoltage protection threshold generator that is configured to generate an overvoltage protection threshold, the overvoltage protection threshold generator comprising a multiplexer that selects a first overvoltage protection threshold voltage having a first level or a second overvoltage protection threshold voltage having a second level; and
a comparator circuit that is configured to compare a sensed output voltage to the overvoltage protection threshold to detect an overvoltage condition of the output voltage,
wherein the controller IC sets the overvoltage protection threshold to the first level that is smaller than the second level during a startup of the controller IC and, in response to detecting, using the feedback circuit, proper operation of the protocol IC, sets the overvoltage protection threshold to the second level.

2. The controller IC of claim 1, wherein the switch controller stops the switching operation of the switch upon detection of the overvoltage condition.

3. The controller IC of claim 1, further comprising an adaptive mode selection block for enabling the overvoltage protection threshold generator to change the overvoltage protection threshold.

4. The controller IC of claim 1, wherein the adaptive mode selection block further comprises:
a current source configured to charge a mode capacitor that is external to the controller IC; and
a mode comparator that enables the overvoltage protection threshold generator to change the overvoltage protection threshold while a mode voltage on the mode capacitor is smaller than an internal voltage during startup of the controller IC.

5. The controller IC of claim 1, wherein the switch controller is configured to control the switching operation of the switch by pulse width modulation (PWM).

6. The controller IC of claim 1, wherein the first overvoltage protection threshold is for protecting the electronic device when the electronic device is charged at 5V and the second overvoltage protection threshold is for protecting the electronic device when the electronic device is charged at 12V.

7. A power adapter for a mobile device comprising:
a protocol integrated circuit (IC) on a secondary side of a transformer, the protocol IC being configured to communicate with the mobile device to charge the mobile device at an output voltage in accordance with a charging protocol; and
a controller IC on a primary side of the transformer, the controller IC being configured to sense the output voltage, trigger overvoltage protection when the output voltage exceeds an overvoltage protection threshold level, set the overvoltage protection threshold level at a first level during startup, detect that the protocol IC is operating properly according to a magnitude of a feedback signal received from the protocol IC, and set the overvoltage protection threshold level at a second level that is higher than the first level after the protocol IC is detected to be operating normally, wherein triggering overvoltage protection includes disabling a drive signal to shut down the output voltage.

8. The power adapter of claim 7, wherein the output voltage of the power adapter changes according to a voltage requirement of the mobile device.

9. The power adapter of claim 7, further comprising:
a connector through which the mobile device receives the output voltage, wherein the protocol IC communicates with the mobile device in accordance with the charging protocol through the connector.

10. The power adapter of claim 9, wherein the connector is a USB connector.

11. The power adapter of claim 7, wherein the controller IC is a PWM controller.

12. The power adapter of claim 7, wherein the charging protocol is a fast charge protocol.

13. A method comprising:
setting an overvoltage protection threshold at a first level during startup of a power adapter that charges an electronic device;
when an overvoltage condition of the output voltage is not detected, providing an output voltage for charging the electronic device;
detecting the overvoltage condition of the output voltage by comparing the output voltage to the overvoltage protection threshold;
when the overvoltage condition of the output voltage is detected, disabling a drive signal to shut down the output voltage;
detecting, according to a magnitude of a feedback signal, an operating condition of a circuit that controls charging of the electronic device on a secondary side of a transformer of the power adapter; and
setting the overvoltage protection threshold at a second level that is higher than the first level after detecting that the circuit that controls the charging of the electronic device has a normal and proper operating condition.

14. The method of claim 13, wherein the circuit that controls the charging of the electronic device comprises a protocol integrated circuit (IC) that charges the electronic device in accordance with a charging protocol.

15. The method of claim 14, wherein the electronic device is a mobile device, and further comprising changing the output voltage in accordance with the charging voltage requirement of the mobile device.

16. The method of claim 15, wherein the protocol IC communicates with the mobile device in accordance with the charging protocol through a USB connector.

17. The method of claim 13, wherein detecting that the circuit that controls the charging of the electronic device has a normal and proper operating condition includes detecting the magnitude of the feedback signal decreasing below a predetermined threshold value.

18. The power adapter of claim 7, wherein the controller IC detects that the protocol IC is operating properly in response to the magnitude of the feedback signal decreasing below a predetermined threshold value.

19. The controller IC of claim 1, wherein the feedback circuit detects the proper operation of the protocol IC in response to the magnitude of the feedback signal decreasing below a predetermined threshold value.

\* \* \* \* \*